United States Patent [19]
Peled et al.

[11] Patent Number: 5,268,687
[45] Date of Patent: Dec. 7, 1993

[54] LASER SCANNING APPARATUS

[75] Inventors: Shalom Peled, Rehovot; Abraham Greenberg, Rishon Le Zion; Haim Livne, Kvar Saba, all of Israel

[73] Assignee: Spectrum Sciences B.V., Wassenaar, Netherlands

[21] Appl. No.: 559,937

[22] Filed: Jul. 30, 1990

[51] Int. Cl.⁵ ............................................. H04N 1/21
[52] U.S. Cl. ................................................... 346/108
[58] Field of Search ................. 346/108, 107 R, 136, 346/134, 160; 358/494; 250/236

[56] References Cited

U.S. PATENT DOCUMENTS

| | | | |
|---|---|---|---|
| 3,863,603 | 2/1975 | Buckley et al. | |
| 3,959,574 | 5/1976 | Seanor et al. | |
| 4,070,089 | 1/1978 | Grafton | 250/236 |
| 4,314,154 | 2/1982 | Minoura et al. | 250/235 |
| 4,445,125 | 4/1984 | Scifres et al. | |
| 4,445,126 | 4/1984 | Tsukada | 346/108 |
| 4,445,128 | 4/1984 | Dolan et al. | |
| 4,453,170 | 6/1984 | Arao | 346/160 |
| 4,474,422 | 10/1984 | Kitamura | |
| 4,547,038 | 10/1985 | Mori | |
| 4,684,238 | 8/1987 | Till et al. | |
| 4,690,539 | 9/1987 | Radulski et al. | |
| 4,750,045 | 8/1988 | Ohara et al. | 358/494 |
| 4,794,651 | 12/1988 | Landa et al. | |
| 4,796,961 | 1/1989 | Yamada et al. | |
| 4,801,978 | 1/1989 | Lama et al. | 346/160 |
| 4,855,290 | 8/1989 | Fisher et al. | |
| 4,933,687 | 6/1990 | Winsor | 346/108 |
| 5,055,860 | 10/1991 | Bannai | 346/108 |

FOREIGN PATENT DOCUMENTS

| | | |
|---|---|---|
| 0205247 | 12/1986 | European Pat. Off. |
| 59-15217 | 1/1984 | Japan |
| 59-112763 | 6/1984 | Japan |
| 2138162 | 10/1984 | United Kingdom |

OTHER PUBLICATIONS

English Language Abstract of Japanese Publication 59-15217.
International Search Report and Annex.
Saunders et al., *J. Med. Chem.* 30:969–975 (1987).
Watson et al., *J. Pharm. Exp. Ther.* 237:411–418 (1986).
Merck Index, Monograph No. 6328, 10th Ed. (1983).

*Primary Examiner*—Mark J. Reinhart
*Attorney, Agent, or Firm*—Sandler Greenblum & Bernstein

[57] ABSTRACT

Apparatus for optical imaging onto a moving surface including a movable surface for receiving an optical image, apparatus for measuring the movement of the surface and providing an surface movement reference signal, optical image producing apparatus operative to produce at least one scanning optical beam for scanning the surface and to provide timing reference signals, and a servo-controlled relay mirror located so as to reflect the at least one scanning beam onto the moving surface. The mirror is precisely positioned in response to the relationship between the substrate movement reference signals and the timing reference signals to ensure proper positioning of the optical image on the moving surface.

15 Claims, 5 Drawing Sheets

LASER SCANNING APPARATUS

FIELD OF THE INVENTION

The present invention relates generally to optical imaging on a moving surface and more particularly to optical imaging in electrophotography.

BACKGROUND OF THE INVENTION

Optical imaging onto a moving substrate is well known, for example in laser printers and photocopiers, which employ a photoconductive drum for receiving the optical image. Normally optical information, such as an image, is imaged or written directly onto a photoconductive drum using appropriate stationary optics together with a rotating polygon or hologon or a galvano-mirror to scan the drum axially. Examples of such systems are illustrated and described in U.S. Pat. Nos. 4,796,961; 4,547,038; 4,445,125 and 4,474,422.

It has been found by the applicants that potentially troublesome distortions can occur due to uneven velocity of the photoconductive drum during imaging. This is particularly true in multi-color, multi-pass photocopying wherein registration misalignment may result. Additionally, image distortions during the writing of the image may be different for different color images. The varying distortions result in local areas of misregistration between images. These problems are especially severe for multi-beam systems.

Methods for at least partially correcting some of these problems are known such as changing the timing of the light signals, as described in U.S. Pat. No. 4,445,128.

SUMMARY OF THE INVENTION

The present invention seeks to provide improved apparatus for optical imaging onto a moving substrate.

There is thus provided in accordance with a preferred embodiment of the present invention apparatus for optical imaging onto a moving surface including a movable surface for receiving an optical image, apparatus for measuring the movement of the surface and providing a surface movement reference signal, optical image producing apparatus operative to produce at least one scanning optical beam for scanning the surface and to provide a timing reference signal, a positionable relay mirror located so as to reflect the at least one scanning optical beam onto the movable surface; and positioning apparatus responsive to the relationship between the surface movement reference signal and the timing reference signal for positioning the mirror to ensure proper placement of the optical scanning beam on the moving surface.

In a preferred embodiment of the invention the movable surface is a drum photoconductor and the apparatus for measuring surface movement is a rotary encoder.

The apparatus further includes, in a preferred embodiment of the invention, apparatus for determining the angular position of the positionable mirror. In a preferred embodiment of the invention the apparatus for determining the angular position includes a linear displacement transducer.

In a preferred embodiment of the invention the movable surface is a photoreceptor surface.

In a preferred embodiment of the invention, the movable surface is the surface of a rotating drum and the surface movement reference signal includes a voltage pulse for each rotation.

In a preferred embodiment of the invention the at least one scanning optical beam successively scans the surface and the timing reference signal includes a voltage pulse for each successive scan.

In a preferred embodiment of the invention the surface is the surface of a rotating drum, the surface movement reference signal includes a first voltage pulse for each rotation, the at least one scanning optical beam successively scans said surface; and the timing reference signal includes a second voltage pulse for each successive scan, and the apparatus also includes apparatus for providing a signal substantially proportional to the time difference between the first and second voltage pulses.

In a preferred embodiment of the invention the positioning apparatus adjusts the angular position of the mirror. The apparatus also includes, in a preferred embodiment of the invention, a position detector for measuring the angular position of the mirror. The positioning apparatus includes apparatus for generating a correction signal responsive to the relationship between the surface movement reference signal and the timing signal, the correction signal corresponding to a desired angular position for the relay mirror. In a preferred embodiment of the invention the positioning apparatus includes apparatus for comparing the correction signal and the angular position of the mirror.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
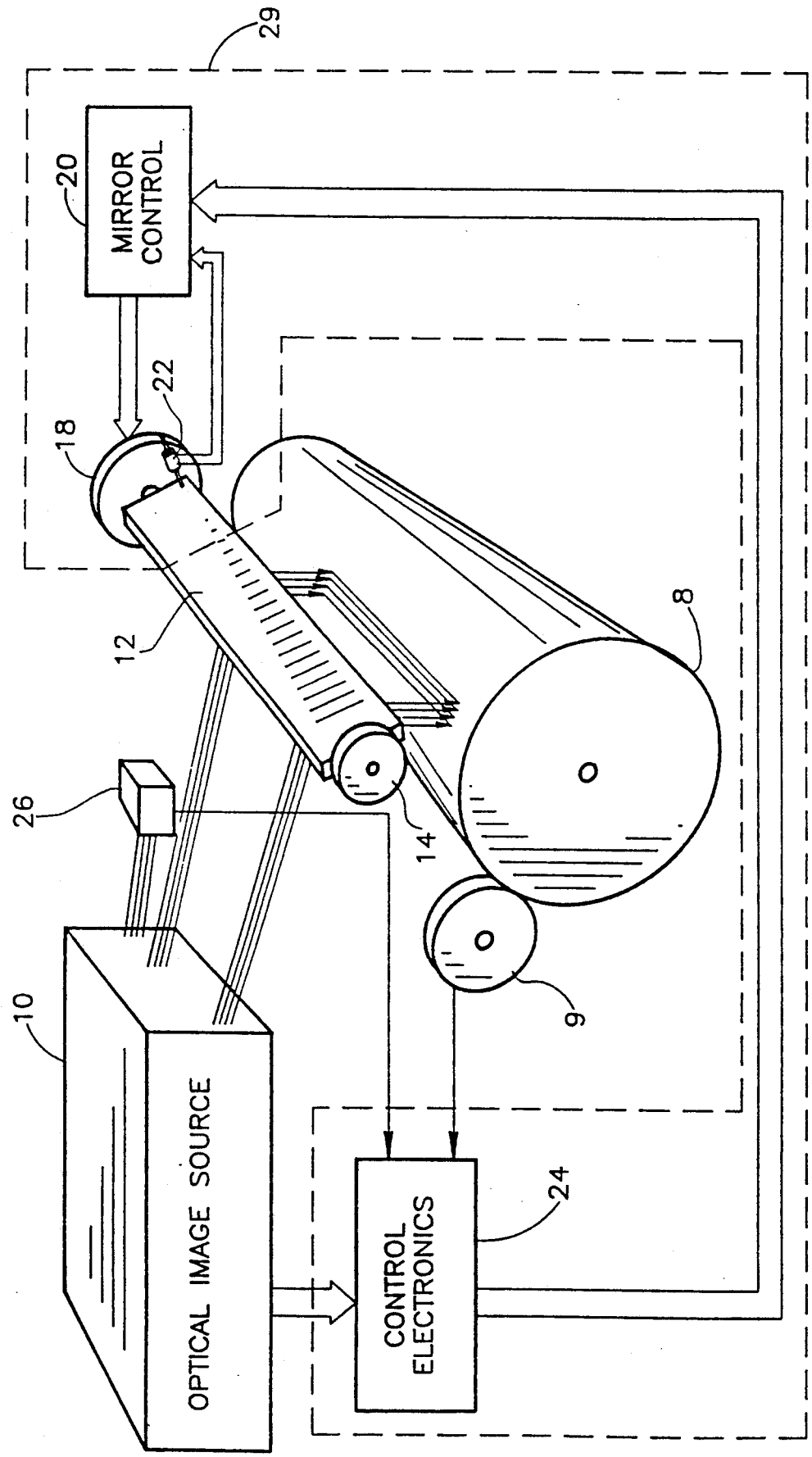
FIG. 1 is a schematic illustration of apparatus for optical imaging onto a moving surface constructed and operative in accordance with a preferred embodiment of the present invention.

Reference is now made to FIG. 1, which illustrates apparatus for optical imaging onto a moving substrate constructed and operative in accordance with a preferred embodiment of the present invention. The apparatus comprises a conventional photoconductor drum 8 which is associated with a rotary encoder 9 such as a Model 8335 Encoder manufactured by Teledyne Gurley, Troy, NY. There is provided an optical image source 10 typically including a laser source, a scanner, such as a rotating polygon, for deflecting the beams generated by the laser source axially 112 along the drum surface, and stationary scanning optics, shown, for example in U.S. Pat. No. 4,445,125, UK Patent Application 2,138,162 and Japanese Patent Document 59-112763, the teachings of which are incorporated herein by reference. In a preferred embodiment of the invention optical image source 10 is a multi-beam laser source.

In accordance with a preferred embodiment of the present invention a servo-controlled dynamic mirror 12 is arranged to receive light transmitted by optical image source 10 and to reflect it onto photoconductor drum 8. Mirror 12 is preferably a protected silver coated, diamondturned mirror having integral rotation axles. One end thereof is preferably supported by a ball bearing 14 and the other end is preferably supported and driven by a servo motor 18. In contrast with the rotation of the polygon, which sweeps the beam axially parallel to the longitudinal axis of drum 8, the rotation of mirror 12 is operative to change the scan line position on the surface of drum 8 along the direction of motion of the drum surface.

Servo motor 18 is controlled by mirror control circuitry 20 which is responsive, inter alia, to the output of a Linear Voltage Displacement Transducer (LVDT) 22, which functions as an angular position detector for precisely indicating the actual angular position of mirror 12. Mirror control circuitry 20 is also responsive to control signals received from control electronics 24. Control electronics 24 receives inputs from encoder 9, preferably in the form of encoder pulses, and from a start of scan (SOS) detector 26, such as a photodiode, which is positioned to receive optical start of scan signals from optical image source 10 and supply electrical start of scan signal pulses to control electronics 24. Control electronics 24 also communicates with optical image source 10 for supplying data for the laser sources and scan control signals for the scanner.

Figure 2:
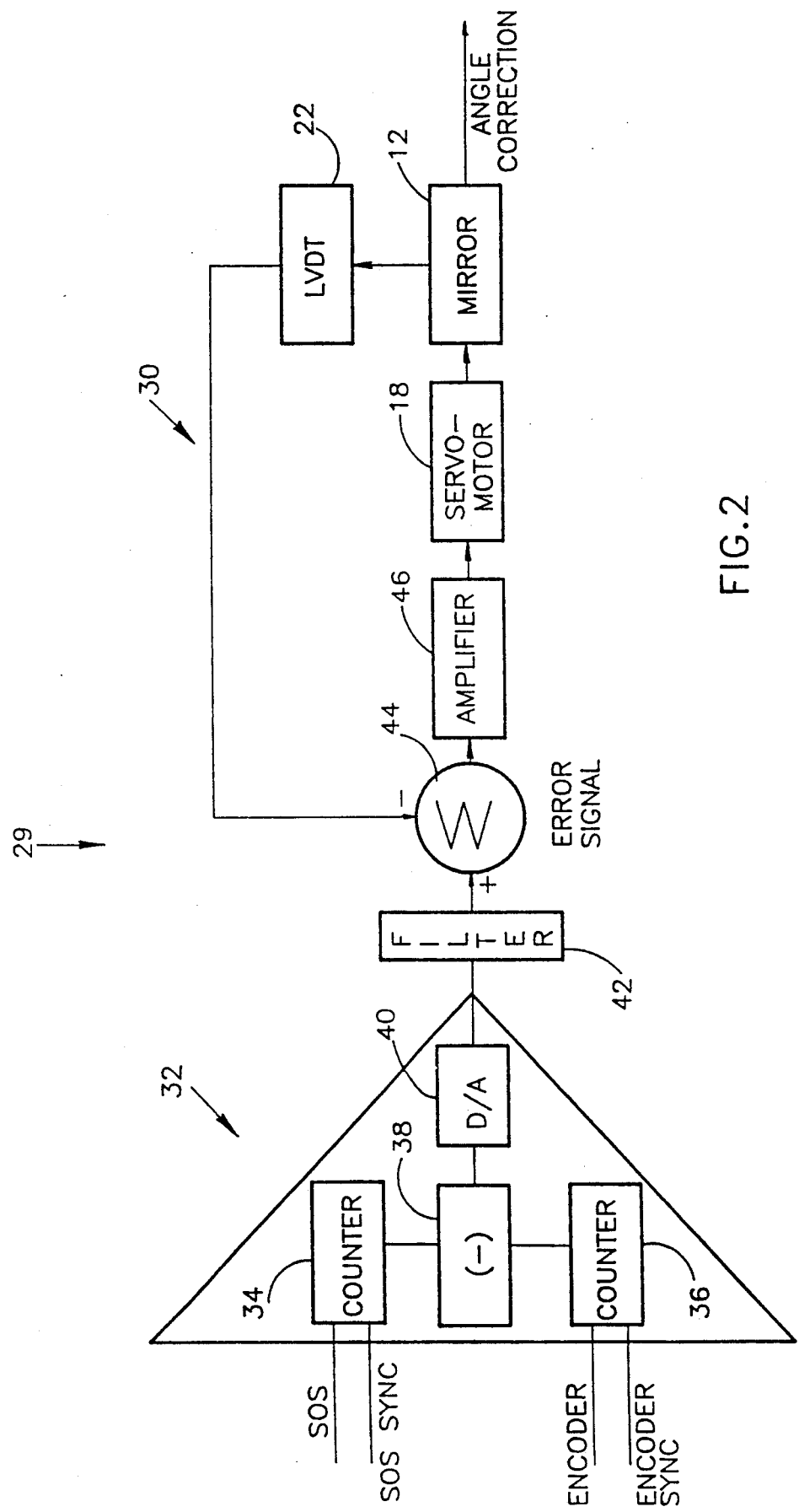
FIG. 2 is a schematic block diagram illustration of electronic apparatus useful in the apparatus of FIG. 1.

Reference is now made to FIG. 2, which illustrates in simplified block diagram form, electronic circuitry 29 useful in the apparatus of FIG. 1. This circuitry includes mirror control 20, LVDT 22, servo motor 18 and control electronics 24, as indicated by the dashed lines in FIG. 1. Generally speaking, the mirror position is governed by a servo loop 30 including servo motor 18 and LVDT 22.

Position error detection circuitry 32 supplies an input to servo loop 30 and is operative to provide a measure of the time difference between the encoder pulses and the start of scan pulses. The feedback in the loop is the actual mirror angular position measured by LVDT 22. The output of LVDT 22 will be referred to as the actual mirror position signal.

It is noted that the circuitry of FIG. 2 does not change the drum 8 velocity or the optical image source 10 scanning rate, but only affects the mirror angular position, and thereby the circumferential position of the scanned beams on drum 8.

Position error detection circuitry 32 employs the start of scan (SOS) and encoder signals to advance two counters 34 and 36 respectively. Counters 34 and 36 also receive SOS sync and encoder synch signals respectively, which originate in control electronics 24. The difference between the counts in counters 34 and 36 is determined by a subtracter 38 and supplied to a digital to analog converter 40. The analog output of digital to analog converter 40 is supplied via a time average filter 42 to feedback loop 30. The output of the time average filter is proportional to the time difference between corresponding counts of counters 34 and 36 and represents the misalignment between the actual position of the scan on the drum and the desired position of the scan on the drum, if the mirror is at its reference position. The output of time average filter 42 thus provides a correction signal proportional to the mirror angle correction required to return the scan to the proper position on the drum. It will be referred herein as the desired mirror position signal.

In feedback loop 30, a summation circuit 44 subtracts actual mirror position signal from the desired mirror position signal, to produce an error signal, which is supplied via an amplifier 46 to servo motor 18 for control of the operation thereof. Once the mirror reaches the desired position, i.e., when the beam is correctly positioned on drum 8, the actual and desired mirror position signals are identical and the error signal goes to zero, terminating servo-motor 18 operation.

As the scanning of the image continues, any variation from correct scan positioning on drum 8, caused for example by speed variation of the drum, will cause the error signal to be different from zero, and servo-motor 18 will be activated to change the angle of mirror 12 to correctly position the scan on drum 8.

The apparatus and method described herein can provide mirror angular correction which is greater than the scan line spacing, and in the case of multi-beam scans, greater than the width of the multi-beam scan. In practice, if a substantial deviation between SOS and encoder rates exists, the angular deviation by the end of a page can be substantial. In extreme cases the correction can be as high as several times the width of the multi-beam scan over the length of a page. In order to prevent the mirror from exceeding its allowed range of rotation for multi-page printing, the system is reset at the end of each page.

At the end of every page, which is determined by predetermined encoder pulse, a reset command is provided by means of the SOS and encoder sync signals. The reset command is operative to set the outputs of counters 34 and 36 to zero and thus to set the desired mirror position signal to zero momentarily. The first SOS pulse after this reset is the new reference SOS pulse both for mirror position and for data transmission to optical image source 10.

The coordinated reset of the desired position signal to zero, together with the resetting of the SOS reference count removes the accumulated mirror correction and realigns the system. Within a few counts the desired position signal returns to a proper value, and the mirror returns to a small angular deviation. The concurrent resetting of the SOS reference count assures that the desired position signal corresponds to the actual requirement for the scan.

After reset, the mirror 12 is dynamically readjusted as described above to substantially eliminate scan misalignment. At a given encoder count, corresponding to the start of the print location, the scan is enabled and printing begins.

The reference location of mirror 12 can be adjusted by supplying an off-set voltage either at the input to loop 30, or alternatively within the loop, as for example by a non-zero off-set voltage for amplifier 46. Alternatively the reference position can be adjusted by delaying the encoder or SOS pulses.

It is a feature of an embodiment of the present invention that the frequency of the output of encoder 12 is selected to be the same as that of the Start of Scan signals, thereby to permit relatively easy phase difference analysis of the signals to be carried out.

Figure 3:
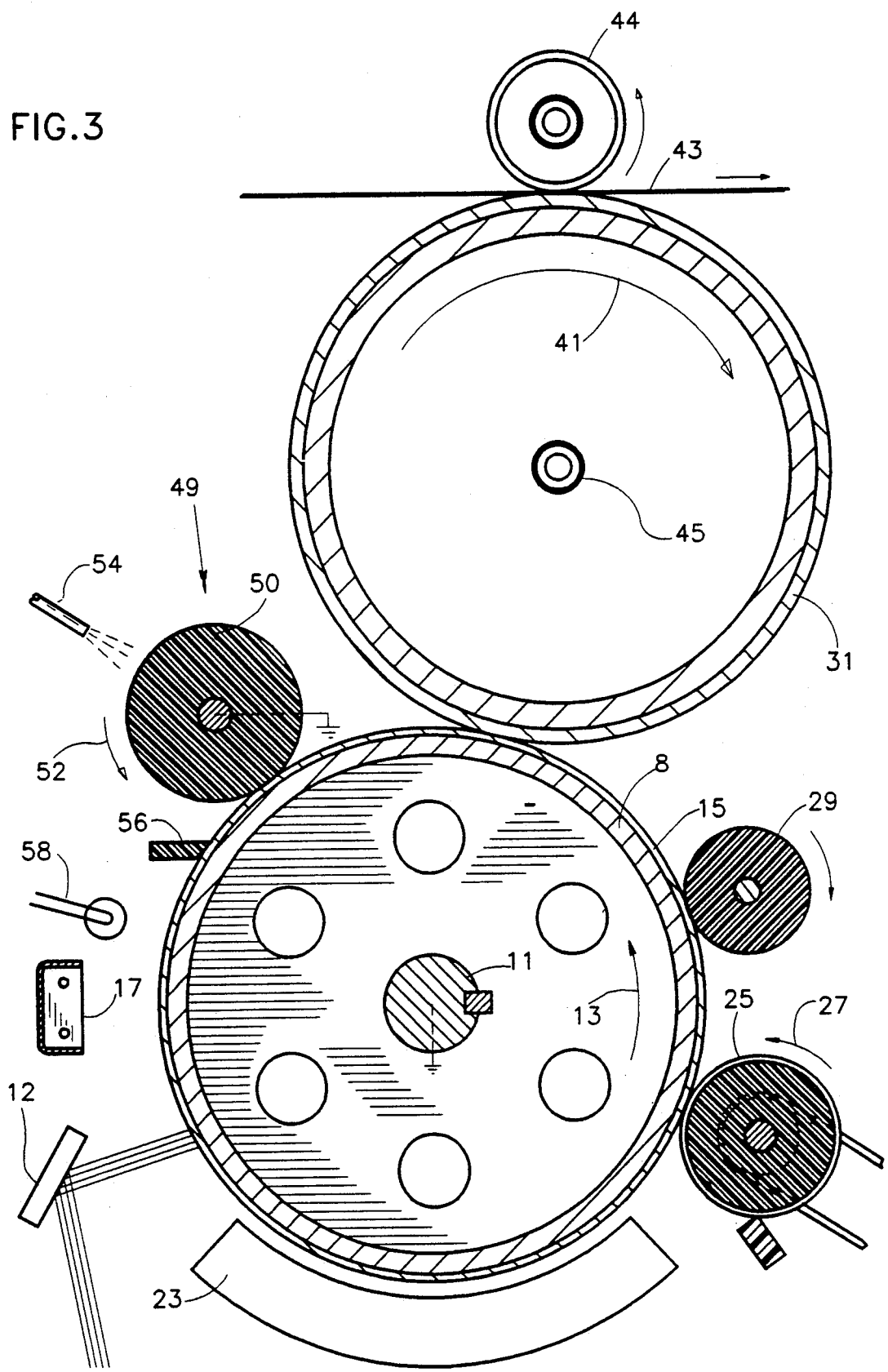
FIG. 3 is a simplified sectional illustration of electrophotographic apparatus constructed and operative in accordance with a preferred embodiment of the present invention.

Reference is now made to FIG. 3 which illustrates electrophotographic imaging apparatus constructed and operative in accordance with a preferred embodiment of the present invention. This and other embodiments of the invention are described in the context of liquid developer systems with negatively charged toner particles and positively charged photoreceptors. Such systems operate in a "write-white" mode, for which areas which are not to be toned are exposed to light. The invention may be useful for other combinations of toner charge, photoreceptor charge as well as for other writing systems, such as "write-black" systems.

The apparatus of the invention is described using a liquid developer system. In accordance with a preferred embodiment of the invention the liquid developer of Example 1 of U.S. Pat. No. 4,794,651 can be used, but other suitable developers may be used in the practice of the invention.

As in conventional electrophotographic systems, the apparatus of FIG. 3 comprises drum 8 arranged for rotation about an axle 11 in a direction generally indicated by arrow 13. Drum 8 is formed with a cylindrical photoreceptor surface 15.

A corona discharge device 17 is operative to generally uniformly charge photoreceptor surface 15 with a positive charge. Continued rotation of drum 8 brings charged photoreceptor surface 15 into image receiving relationship with an exposure unit including mirror 12 (FIG. 1). Mirror 12, as described hereinabove in detail, in accordance with a preferred embodiment of the invention, reflects a desired image, which may be laser generated, and is shown as been generated by four parallel beams, onto charged photoreceptor surface 15, selectively discharging the photoreceptor surface, thus producing an electrostatic latent image thereon.

Continued rotation of drum 8 brings charged photoreceptor surface 15 bearing the electrostatic latent image into operative association with a development unit 23, operative to apply a liquid developer to develop the electrostatic latent image. For multicolor copying or printing, the development unit 23 can, for example, comprise a plurality of developers, one for each color, which are selectively engaged with the photoreceptor, as described, for example in U.S. Pat. No. 4,690,539, which is incorporated herein by reference, or a single development station where the liquid toner is changed between colors, or any other suitable development system.

In accordance with a preferred embodiment of the invention, following application of toner thereto, photoreceptor surface 15 passes a typically positively charged rotating roller 25, preferably rotating in a direction indicated by an arrow 27. Roller 25 functions as a metering roller and reduces the thickness of liquid on photoreceptor surface 15. Typically the spatial separation of roller 25 from photoreceptor surface 15 is about 50 microns.

Preferably the voltage on roller 25 is intermediate the voltages of the latent image areas and of the background areas on the photoreceptor surface. Typical voltages are: roller 25: +200V, background area: +50V and latent image areas: up to about +1000V.

Liquid which passes roller 25 should be relatively free of pigmented particles except in the region of the latent image.

Downstream of roller 25 there is preferably provided a rigidizing roller 29. Rigidizing roller 29 is preferably formed of a resilient polymeric material, such as conductive resilient polymeric material as described in either or both of U.S. Pat. Nos. 3,959,574 and 3,863,603. Roller 29 is preferably resiliently urged against photoconductive surface 15.

In a preferred embodiment of the invention, a biased squeegee roller is used as roller 29. Roller 29 is negatively charged to a potential of at least several hundred and up to 2000 volts with the same sign as the charge on the pigmented toner particles, so that it repels similarly charged pigmented particles and causes them to more closely approach the image areas of the photoreceptor surface 15, thus compressing and rigidizing the image.

Downstream of rigidizing roller 29 there is provided an intermediate transfer member 31, which rotates in a direction opposite to that of photoreceptor surface 15, as shown by arrow 41, providing zero relative motion between their respective surfaces at the point of propinquity. Intermediate transfer member 31 is operative for receiving the toner image photoreceptor surface 15 and for transferring the toner image to a receiving substrate 43, such as paper. A roller 44 may be provided to press substrate 43 against intermediate transfer member 31 to improve transfer. Disposed internally of intermediate transfer member 31 there may be provided a heater 45, to heat intermediate transfer member 31.

Various types of intermediate transfer members are known and are described, for example, in U.S. Pat. No. 4,684,238 and in assignee's copending U.S. Pat. application entitled METHOD AND APPARATUS FOR IMAGING USING AN INTERMEDIATE TRANSFER MEMBER filed Jan. 4, 1989, and bearing serial number 293,456, the disclosures of both of which are incorporated herein by reference.

Following the transfer of the toner image to intermediate transfer member 31, photoreceptor surface 15 engages a cleaning station 49. This station may be any conventional cleaning station, comprising a cleaning roller 50 which may comprise a suitable resilient material such as foam polyethylene or neoprene. Cleaning roller 50 may be wetted by clean lubricating cleaning liquid, which preferably comprises liquid developer from which all or nearly all of the toner particles have been removed. Cleaning roller 50 is driven so that its surface moves opposite to surface 15 at their nip, to provide scrubbing action for removal of residual particles and carrier liquid from photoconductor surface 15. A scraper 56 completes the removal of any residual toner which may not have been removed by cleaning station 49.

A lamp 58 complete the cycle by removing any residual charge, characteristic of the previous image, from photoconductor surface 15.

In printing a full color image, the above process is repeated for successive colors, which are successively transferred to intermediate transfer member 31. The images may then be successively transferred to substrate 43, in mutual alignment, or they may be transferred as a group from intermediate transfer member 31 to substrate 43.

Figure 4:
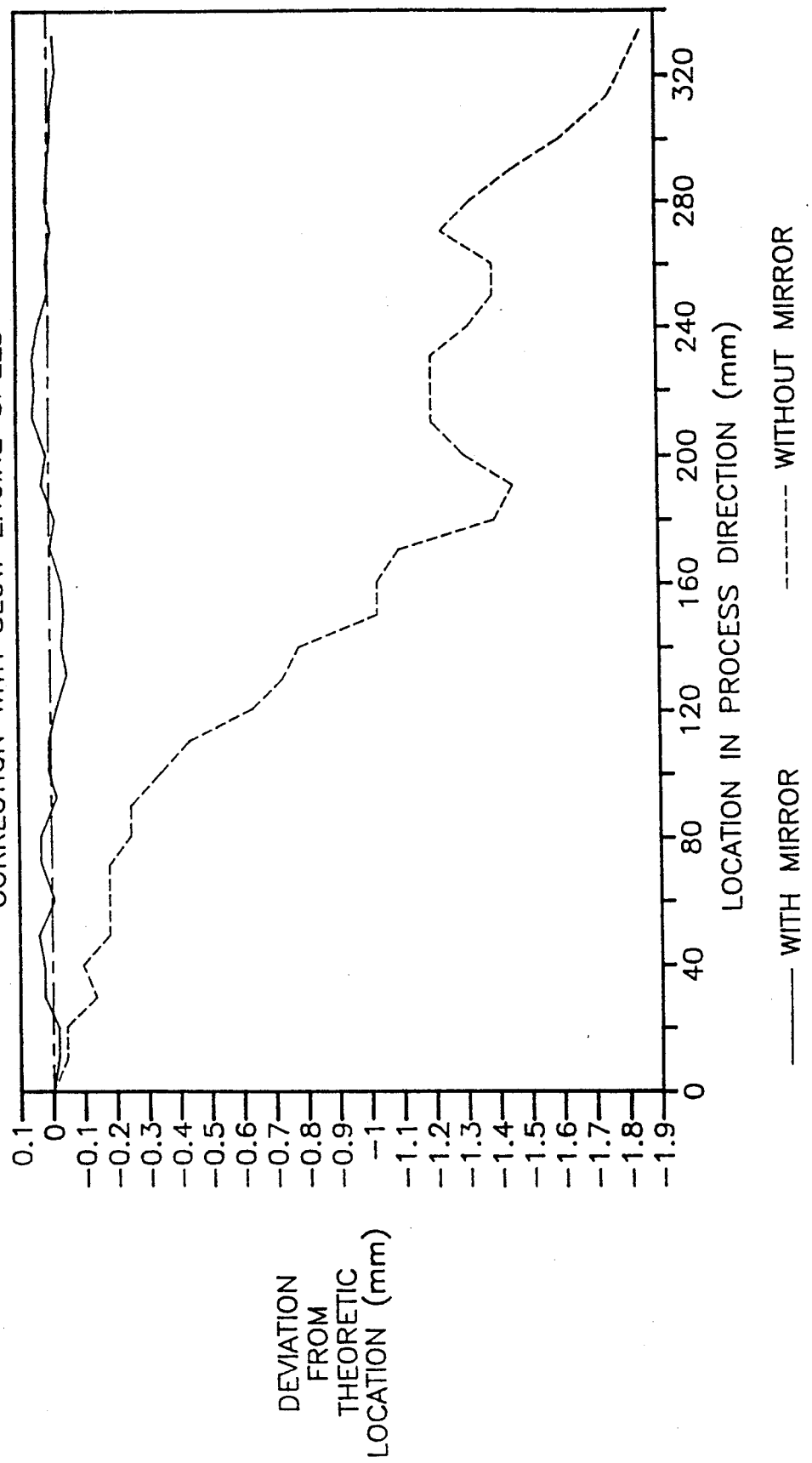
FIG. 4 is a graph illustrating experimental results actually obtained with and without use of the servo mirror of the present invention.

In order to determine the increased imaging accuracy provided by the apparatus of the present invention, apparatus of the type illustrated in FIG. 3 was operated and the deviation from the theoretical imaging location on the substrate was measured along 0.34 meters, wherein a 0.5% error in the speed of drum 8 was intentionally introduced. A similar run was made for identical apparatus except that motor 18 was disabled. The results, illustrated in FIG. 4, illustrate a significant improvement in accuracy of imaging location.

Figure 5:
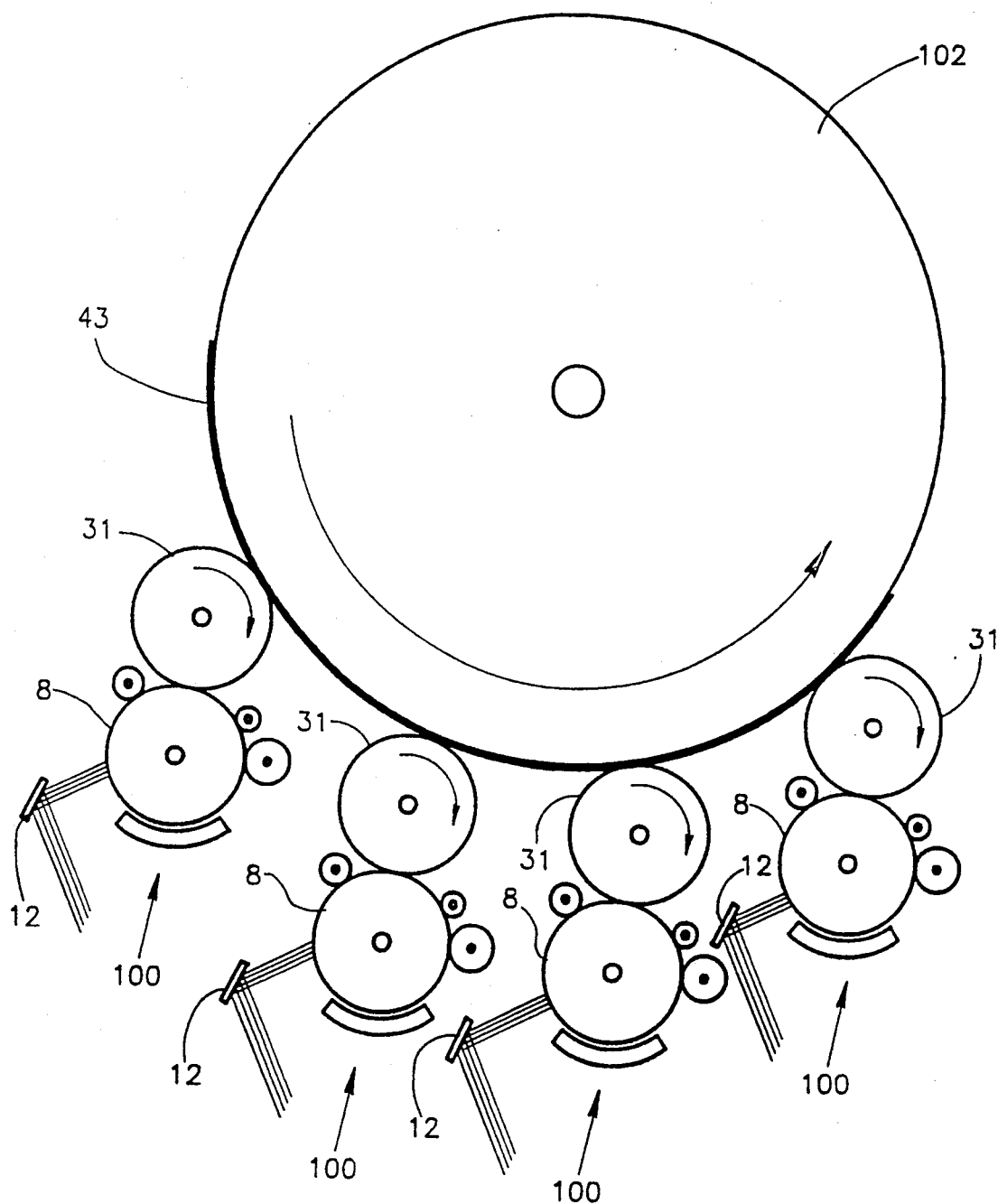
FIG. 5 is a simplified sectional illustration of alternative electrophotographic apparatus constructed and operative in accordance with a preferred embodiment of the present invention.

The invention has been described for a system having a single development system and a single intermediate transfer member. An alternative system is shown in FIG. 5, having four single color sub-systems 100, each comprising all of the components shown in FIG. 3 except for substrate 43 and backing roller 44, circumferentially arranged around roller 102. The apparatus shown in FIG. 5 is also operative in accordance with the practice of the present invention. In this system, the separate color images are each produced on a different sub-systems 100 and are transferred to substrate 43 disposed on roller 102. In operation, roller 102 rotates and substrate 43 successively passes the different subsystems, for transfer of the images thereto. Adjustment of the reference angular positions of mirrors 12 in each of sub-systems 100, as described above is then operative to align the top of page of the different colors. The dynamic mirror adjustment is then operative to overcome speed variations within an image.

The dynamic mirror system of the invention is especially useful in a multi-beam system where uncorrected start of scan errors can be as high as scan line spacing multiplied by the number of beams. It is also useful for the correction of start errors in single beam scanner systems, and for the dynamic correction of drum and/or scanner instabilities for both single beam and multi-beam systems.

It will be appreciated by persons skilled in the art that the present invention is not limited by what has been particularly shown and described herein. Rather the scope of the present invention is defined only by the claims which follow:

We claim:

1. Apparatus for optical imaging onto a moving surface comprising:
   a movable surface for receiving an optical image;
   means for measuring the movement of the surface and providing a surface movement reference signal;
   optical image producing means operative to produce at least one scanning optical beam for scanning said surface and to provide a timing reference signal;
   a positionable relay mirror located so to reflect said at least one scanning optical beam from the scanner without any intervening refractive elements onto the moving surface; and
   positioning means responsive to the relationship between the surface movement reference signal and the timing reference signal for positioning said mirror to ensure proper placement of the optical scanning beam on the movable surface.

2. Apparatus according to claim 1 and wherein said movable surface is a drum photoconductor and said means for measuring surface movement is a rotary encoder.

3. Apparatus according to claim 1 and also comprising means for determining the angular position of said positionable mirror.

4. Apparatus according to claim 1 and wherein said movable surface is a photoreceptor surface.

5. Apparatus according to claim 1 wherein said movable surface is the surface of a rotating drum and said surface movement reference signal comprises a voltage pulse for each rotation.

6. Apparatus according to claim 1 wherein said at least one scanning optical beam successively scans said surface and said timing reference signal comprises a voltage pulse for each successive scan.

7. Apparatus according to claim 1 wherein
   said surface is the surface of a rotating drum;
   said surface movement reference signal comprises a first voltage pulse for each rotation;
   said at least one scanning optical beam successively scans said surface; and
   and said timing reference signal comprises a second voltage pulse for each successive scan, said apparatus also comprising:
   means for providing a signal substantially proportional to the time difference between said first and second voltage pulses.

8. Apparatus according to claim 3 wherein said positioning means adjusts the angular position of said mirror.

9. Apparatus according to claim 8 and also including a position detector for measuring the angular position of the mirror.

10. Apparatus according to claim 9 wherein said positioning means comprises means for generating a correction signal responsive to the relationship between the surface movement reference signal and the timing signal, said correction signal corresponding to a desired angular position for said relay mirror.

11. Apparatus according to claim 9 wherein said positioning means also includes means for comparing said correction signal and said angular position of the mirror.

12. Apparatus according to claim 3 wherein said means for determining the angular position comprises a linear displacement transducer.

13. Apparatus according to claim 1 wherein the at least one beam comprises a plurality of beams distributed in the direction of movement of the surface.

14. Apparatus according to claim 1 wherein the mirror reflects the at least one beam directly onto the movable surface without any intervening optical elements.

15. Apparatus according to claim 13 wherein the mirror reflects the at least one beam directly onto the movable surface without any intervening optical elements.

* * * * *